(No Model.)
H. HARFORD.
CHAIN DRIVING GEAR.
No. 598,179. Patented Feb. 1, 1898.
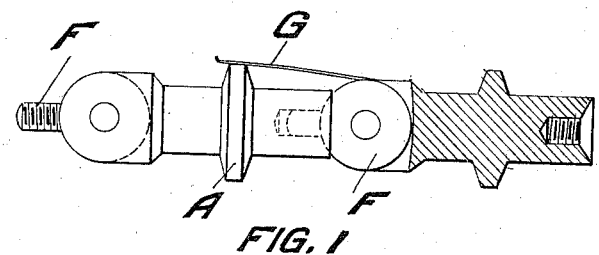
FIG. 1
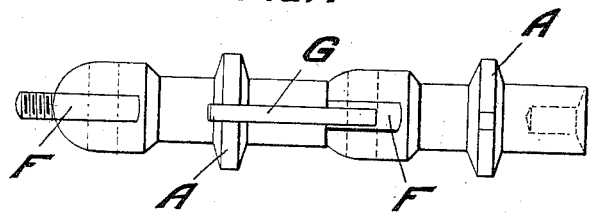
FIG. 2
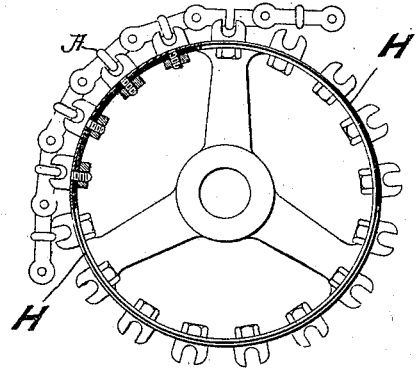
FIG. 3  FIG. II
Witnesses:
E. B. Bolton
Inventor:
Havelock Harford
By Richard
his Attorneys.

UNITED STATES PATENT OFFICE.

HAVELOCK HARFORD, OF SOUTH SHIELDS, ENGLAND.

CHAIN DRIVING-GEAR.

SPECIFICATION forming part of Letters Patent No. 598,179, dated February 1, 1898.

Application filed April 28, 1897. Serial No. 634,279. (No model.) Patented in England February 12, 1895, No. 3,025.

*To all whom it may concern:*

Be it known that I, HAVELOCK HARFORD, engineer, a subject of the Queen of Great Britain, and a resident of 3 Albion Terrace, South Shields, in the county of Durham, England, have invented a certain new and useful Improvement in Cycle and other Chain Driving-Gear, (for which I have obtained a patent in Great Britain, No. 3,025, bearing the date of February 12, 1895,) of which the following is a specification.

My invention relates to drive-chains, and particularly to that form of chain having flanges on the links thereof adapted to engage sockets or socketed teeth on the sprocket-wheel.

My object is to provide a chain in which the distance between the flanges of the links may be changed.

In the accompanying drawings, Figure 1 is a side view, partly in section, of a pair of links. Fig. 2 is a plan view of the same, and Fig. 3 is a view of a chain engaging its sprocket-wheel.

The links are pivotally connected together, and they carry flanges A, adapted to engage the socketed teeth of the wheel H, Fig. 3.

In order to adjust the distance between the flanges A, I employ a screw connecting-piece F between each pair of links, so that the desired adjustment can be obtained.

To prevent any accidental turning movement of the connecting-pieces when the chain is in motion, I employ a locking device consisting of a spring or catch, such as G, having one end secured in any convenient manner to the connecting-piece while the opposite and free end engages with a groove in the central flange A.

I claim—

In combination in a driving-chain the links, the adjustable connecting-pieces between the links, and the locking device to hold the connecting-pieces in their adjusted positions, substantially as described.

In witness whereof I have hereunto set my hand in presence of two witnesses.

HAVELOCK HARFORD.

Witnesses:
 EDWARD MARKS,
 HERBERT BOWKETT.